United States Patent
Kaptrosky

[11] Patent Number: 5,810,116
[45] Date of Patent: Sep. 22, 1998

[54] BEARING LUBRICATION MECHANISM

[75] Inventor: Alfred R. Kaptrosky, Ovid, Mich.

[73] Assignee: New Venture Gear, Inc., Troy, Mich.

[21] Appl. No.: 869,234

[22] Filed: Jun. 4, 1997

[51] Int. Cl.[6] .................................................... F01M 1/00
[52] U.S. Cl. ................ 184/11.1; 184/11.2; 184/13.1; 184/6.12; 74/467
[58] Field of Search .............................. 74/467; 184/6.12, 184/11.1, 11.2, 11.4, 11.5, 13.1, 61, 62, 63

[56] References Cited

U.S. PATENT DOCUMENTS

| | | | |
|---|---|---|---|
| 4,221,279 | 9/1980 | Jones et al. | 184/6.12 |
| 4,317,386 | 3/1982 | Ida et al. | 74/467 |
| 4,359,142 | 11/1982 | Schultz et al. | |
| 4,359,909 | 11/1982 | Sogo | 74/467 |
| 4,766,773 | 8/1988 | Yamaguchi et al. | 74/467 |
| 4,842,100 | 6/1989 | Cameron et al. | 184/11.2 |
| 5,005,437 | 4/1991 | Furer et al. | 74/467 |

FOREIGN PATENT DOCUMENTS

| | | | |
|---|---|---|---|
| 741617 | 8/1966 | Canada | 184/6.12 |
| 1163161 | 2/1964 | Germany | 184/6.12 |
| 1625032 | 6/1970 | Germany | 184/6.12 |
| 0018160 | 2/1981 | Japan | 184/6.12 |

*Primary Examiner*—Thomas E. Denion
*Attorney, Agent, or Firm*—Harness, Dickey & Pierce, P.L.C.

[57] ABSTRACT

The present invention provides a lubrication mechanism for collecting and directing oil from a gear assembly to a bearing supporting a first component for rotation relative to a second component. In a preferred embodiment of the present invention, a bearing assembly is arranged to permit relative rotation between an input shaft and an output shaft in a manual transmission. A lubrication flow path including a bore and channel is formed between the bearing assembly and a gear assembly external of the input and output shafts. A lubrication guide member disposed in the flow path collects and directs oil from the gear assembly toward the bearing assembly.

14 Claims, 3 Drawing Sheets

BEARING LUBRICATION MECHANISM

BACKGROUND OF THE INVENTION

1. Technical Field

The present invention relates generally to lubrication mechanisms and, more particularly, to a lubrication mechanism for lubricating a pocket bearing assembly interposed between a rotatable shaft and a shaft journal.

2. Discussion

As is known, bearing assemblies are used to support a first component (i.e., an input shaft) for rotation relative to a second component (i.e., an output shaft). Typical bearing assemblies include a plurality of rolling contact elements (i.e., balls, rollers, etc.) retained between the components. To maintain proper performance, the bearing assembly must be sufficiently lubricated.

To accomplish this, oil may be diverted from a gearing assembly to the bearing assembly. For instance, according to one prior art method, a radial bore is formed through the end of the input shaft such that a radial passage is formed between an area exterior of the bearing assembly and the bearing. Alternatively, a lubrication impeller may be mounted on the input shaft to force oil to the bearing through a plurality of transversely drilled passages.

While such conventional lubricating arrangements are widely used, there is room for improvement in the art. For example, it would be desirable to provide a lubrication mechanism for more efficiently directing oil to the bearing assembly.

Additionally, it would be desirable to provide a lubrication mechanism having a specialized structure dedicated to collecting and directing oil from surrounding assemblies to the bearing assembly.

Further, it would be desirable to provide a lubrication mechanism utilizing the rotation of the components for enhancing the supply of oil to the bearing assembly.

SUMMARY OF THE INVENTION

The above and other objects are provided by a lubrication mechanism for collecting and directing oil from a gear assembly to a bearing supporting a first component for rotation relative to a second component. In a preferred embodiment of the present invention, a bearing assembly is arranged to permit relative rotation between an input shaft and an output shaft in a manual transmission. A lubrication flow path including an axial bore and a tangential channel is formed between the bearing assembly and a gear assembly external of the input and output shafts. A lubrication guide member disposed in the lubrication flow path collects and directs oil from the gear assembly toward the bearing assembly. As such, the bearing assembly is properly lubricated.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 5 is a top view of a lubrication guide member of the lubrication mechanism of the present invention; and FIG. 6 is a side view of the lubrication guide member of the lubrication mechanism of the present invention.

DETAILED DESCRIPTION OF THE PREFERRED EMBODIMENTS

The present invention is directed toward a lubrication mechanism for collecting and delivering oil to a bearing assembly between two components. In the embodiment described and illustrated, the two components include an input shaft and an output shaft of a manual transmission. As will be appreciated however, the input shaft and output shaft are merely exemplary of the type of components used with the lubrication mechanism of the present invention for lubricating the bearing assembly therebetween.

Figure 1:
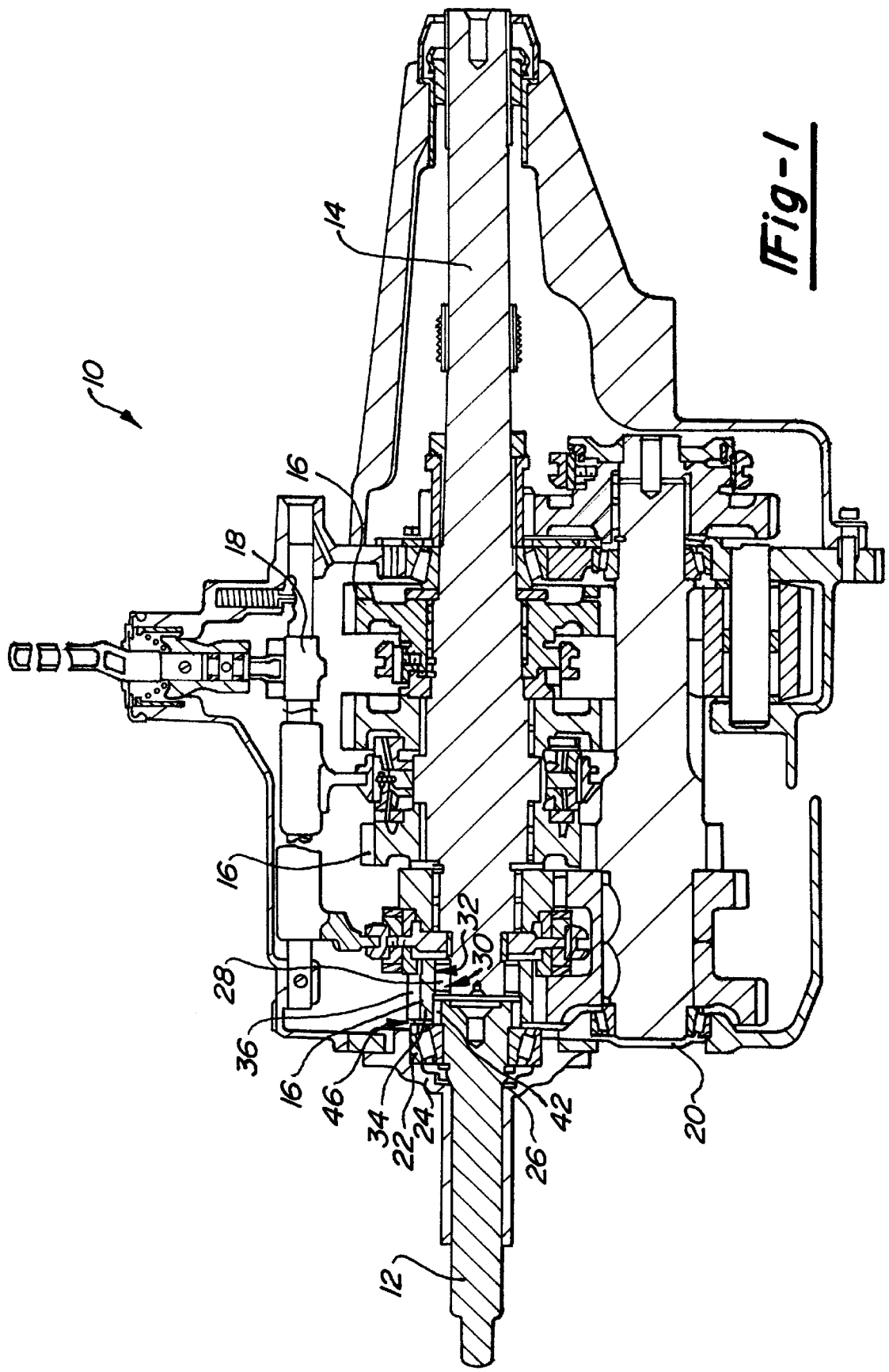
FIG. 1 is a side view in cross-section of a manual transmission having a bearing assembly supporting an output shaft for rotation relative to an input shaft and a lubrication mechanism for delivering oil to the bearing assembly according to the present invention.

Referring now to the drawings, a manual transmission 10 is illustrated in cross section in FIG. 1. The manual transmission 10 includes an input shaft 12 coacting with an output shaft 14 via a plurality of gear assemblies 16. A shift assembly 18 is provided for interconnecting the input shaft 12 and the output shaft 14 through different combinations of the gear assemblies 16 to effectuate different ratios of rotation between the input shaft 12 and the output shaft 14. As is known, a predetermined quantity of oil is disposed within the transmission housing 20 at any given time for lubricating the gear assemblies 16 therein.

The input shaft 12 is supported for rotary movement relative to the transmission housing 20 by a bearing assembly 22. The bearing assembly 22 is secured between the housing 20 and the input shaft 12 via a bearing retainer 24 which is coupled to the housing 20 and bearing assembly 22 at a first end and the is supported along the input shaft 12 at a second end. A seal 26 is disposed between the bearing retainer 24 and the input shaft 12 to prevent leakage of oil from a first side of the seal 26 to a second side thereof.

The output shaft 14 is supported for rotary motion relative to the input shaft 12 by a pocket bearing 28. The pocket bearing 28 is secured in place by interengaging a pocket bearing journal 30 of the output shaft 14 and a pocket bearing journal 32 of the input shaft 12. In this way, the input shaft 12 and the output shaft 14 may freely rotate relative to one another.

Figure 2:
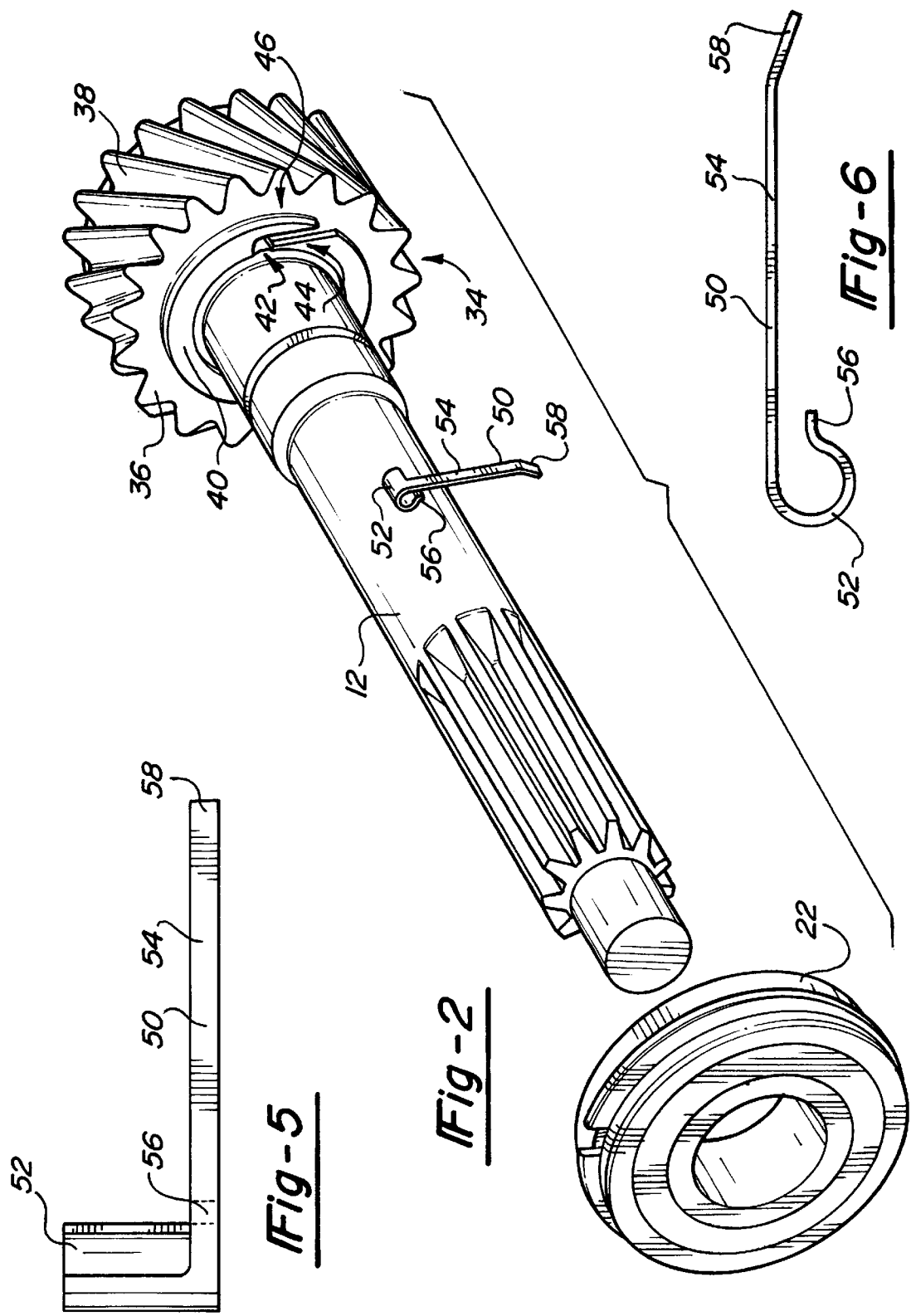
FIG. 2 is an exploded perspective view of the input shaft of FIG. 1 illustrating the components of the lubrication mechanism of the present invention.

Referring now also to FIG. 2, the input shaft 12 includes an input gear assembly 34 formed at a first end thereof. The input gear assembly 34 includes an annular gear 36 having a plurality of teeth 38 thereon. A hub 40 is integrally formed at the interface of the annular gear 36 and the input shaft 12 for maintaining proper spacing between the annular gear 36 and the bearing assembly 22.

The hub 40 and the annular gear 36 include an axial bore 42 formed therethrough for directing oil from a first side of the annular gear 36 to a second side thereof. The bore 42 communicates with a channel 44 extending tangentially therefrom through the radius of the hub 40. The channel 44 and the bore 42 combine to form an oil flow path for directing oil from a gap 46 between the annular gear 36 and the bearing assembly 22 outside the perimeter of the hub 40 to a pocket 48 (FIG. 3) opposite the annular gear 36. To facilitate drawing down of oil from the gap 46 exterior of the hub 40 to the bore 42, a lubrication guide member or oil spring clip 50 is disposed within the bore 42 and the channel 44.

Figure 3:
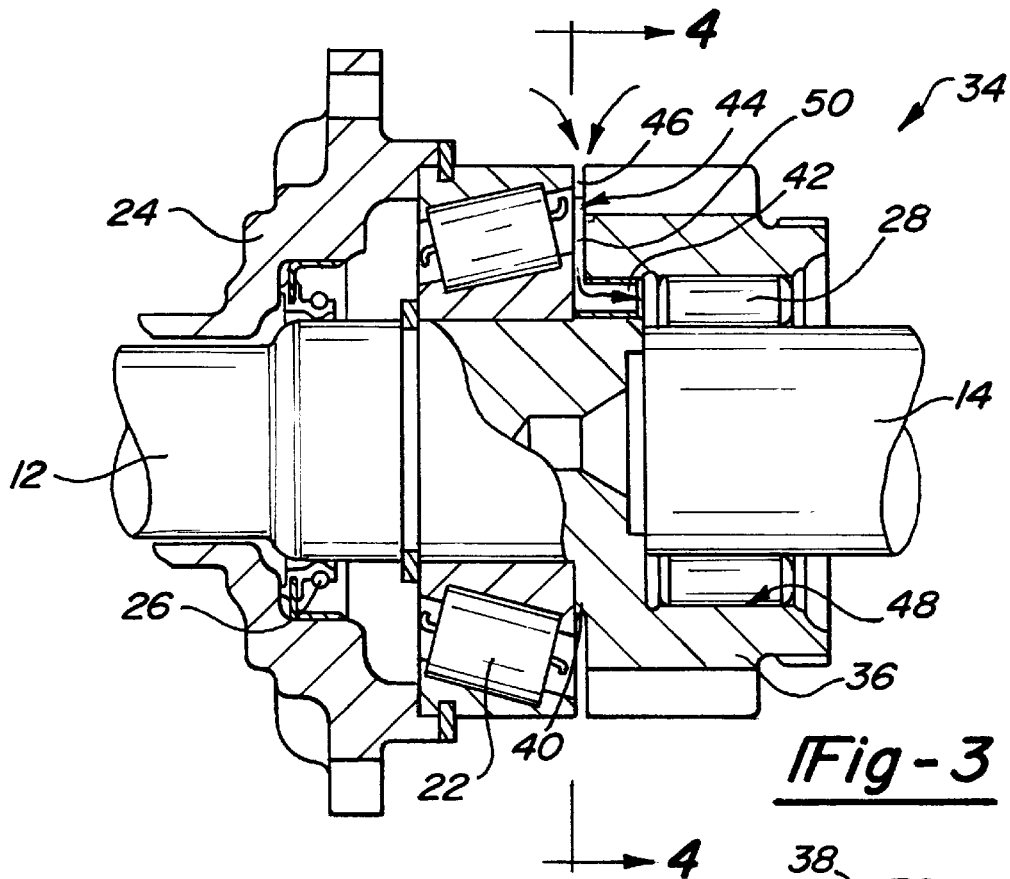
FIG. 3 is an enlarged view in cross section depicting the interengagement of the input shaft, output shaft, pocket bearing and lubrication mechanism of the present invention.

Turning now to FIG. 3, as indicated by the arrows, oil within the transmission housing 20 flows into the gap 46 during operation. A portion of this oil is directed into the channel 44 and through the axial bore 42 by the oil spring clip 50. The oil transgressing the axial bore 42 enters the pocket 48 formed in the end of the input shaft 12 and lubricates the pocket bearing 28 therein.

As illustrated, the inside diameter of the pocket 48 is greater than the outside diameter of the input shaft 12. As such, the axial bore 42 is easily formed through the hub 40 and the annular gear 36 to interconnect the pocket 48 and the gap 46 exterior of the annular gear 36. Therefore, the axial bore 42 and channel 44 funnel oil from the gear assemblies proximate the input gear assembly 34 to the pocket bearing assembly 28. The funneling of the oil down the lubrication flow path is enhanced by the oil spring clip 50 positioned therein.

Figure 4:
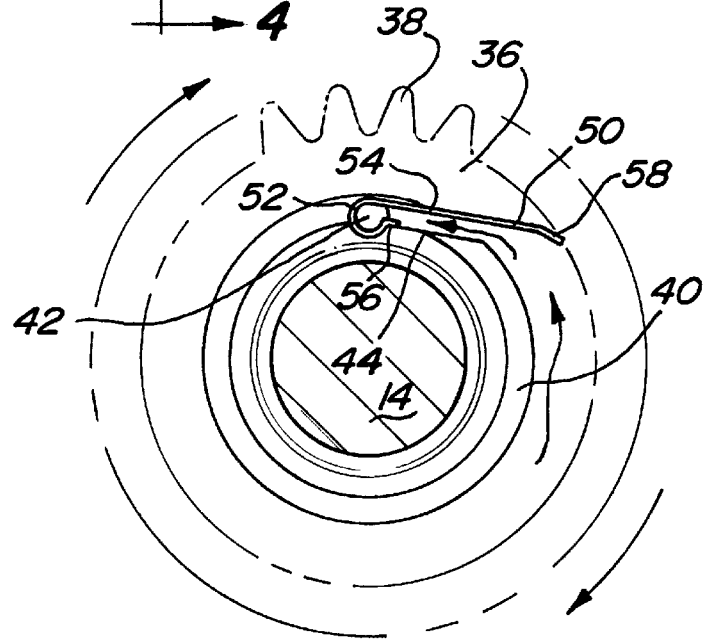
FIG. 4 is a plan view of the lubrication mechanism of the present invention taken along line 4—4 of FIG. 3.

As best seen in FIG. 4, the oil spring clip 50 extends beyond the perimeter of the hub 40 to or nearly to the root diameter of the annular gear 36. Therefore, as the annular gear 36 rotates, oil frictionally rotating with the gear 36 impinges upon the oil spring clip 50 and is diverted through the channel 44 to the axial bore 42. As shown in FIGS. 5 and 6, the oil spring clip 50 includes a c-shaped cylindrical portion 52 and an arm portion 54 extending therefrom. Preferably, the cylindrical portion 52 is formed of half-hard steel such that it possesses a known amount of flexibility. Also, the diameter of the cylindrical portion 52 is preferably slightly larger than that of the bore 42. Accordingly, the cylindrical portion 52 may be compressed and inserted into the bore 42 where it remains secured by spring tension. Alternatively, the cylindrical portion 52 may be cemented or otherwise fixedly secured in the bore 42.

When properly oriented, the arm 54 is disposed within the channel 44 between the bearing assembly 22 and the hub 40. A tab 56 adjacent the cylinder portion 52 supports the spring clip 50 at a predetermined height within the channel 44 and positions the arm 54 so as to maintain an open flow path through the channel 44. Preferably, this height is equal to or less than the depth of the channel 44 to prevent interference between the arm 54 and the bearing assembly 22. The oil spring clip arm 54 also includes an angled end 58 for enhancing the volume of oil captured and redirected to the pocket bearing 28.

In operation, the oil spring clip 50 is mounted within the bore 42 such that its arm 54 is aligned within the channel 44 between the bearing assembly 22 and the hub 40. As the input shaft 12 rotates relative to the housing 20 and the bearing assembly 22, oil in the gap 46 between the bearing assembly 22 and the input gear assembly 34 is collected by the arm 54 and directed toward the bore 42. The oil transcends the bore 42 and enters the pocket 48 adjacent the pocket bearing 28 and output shaft 14. The oil delivered to the pocket 48 lubricates the pocket bearing 28 thereby ensuring efficient operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A lubrication mechanism comprising:
   a first component having a pocket formed at a first end thereof;
   a gear assembly coupled to said first component proximate said pocket, said gear assembly including a bore formed therethrough so as to communicate with said pocket;
   a second component;
   a bearing assembly arranged to permit relative rotation between said first and second components; and
   a spring clip engaging said gear assembly adjacent said bore for collecting and directing lubrication toward said pocket and said bearing assembly.

2. The lubrication mechanism of claim 1 wherein said first component further comprises an input shaft and said second component further comprises an output shaft and wherein said bearing assembly is arranged to support said output shaft for rotation within said pocket of said input shaft.

3. The lubrication mechanism of claim 1 further comprising a channel communicating with said bore.

4. The lubrication mechanism of claim 1 wherein said spring clip further comprises a first portion coupled with said bore and an arm portion extending therefrom, said arm portion being positioned so as to direct lubrication from an area external of said gear assembly toward said bore.

5. The lubrication mechanism of claim 4 further comprising a channel extending from said bore, said arm portion disposed in said channel.

6. The lubrication mechanism of claim 4 wherein said first portion of said spring clip further comprises a cylindrical member disposed within said bore.

7. The lubrication mechanism of claim 1 wherein said bore is formed axially through said gear assembly.

8. A lubrication mechanism comprising:
   an input shaft including a pocket formed at a first end thereof;
   an input gear assembly coupled to said input shaft proximate said pocket, said input gear assembly including an axial bore therethrough communicating with said pocket;
   a housing;
   a first bearing assembly coupled to said housing and said input shaft for supporting said input shaft for rotational movement relative to said housing, said first bearing assembly being spaced apart from said input gear assembly so as to define a gap therebetween communicating with said bore;
   a second bearing assembly disposed within said pocket of said input shaft;

an output shaft coupled to said second bearing assembly so as to be rotatable relative to said input shaft;

an oil spring clip having a first portion engaging said input gear assembly adjacent said axial bore and an arm portion extending from said first portion into said gap for drawing lubrication down said gap and into said axial bore and said pocket.

9. The lubrication mechanism of claim 8 wherein said input gear assembly further comprises a channel extending from said axial bore to said gap.

10. The lubrication mechanism of claim 9 wherein said arm portion of said oil spring clip is disposed in said channel.

11. The lubrication mechanism of claim 8 wherein said first portion of said oil spring clip further comprises a cylindrical member disposed within said axial bore.

12. A lubrication mechanism comprising:

a first component;

a second component;

a bearing assembly arranged to permit relative rotation between said first and second components;

a lubrication flow path communicating with said bearing assembly, said lubrication flow path including an axial bore formed through a portion of said first component; and a lubrication guide member including a cylindrical portion inserted within said axial bore and an arm portion extending therefrom for collecting and directing lubrication toward said bearing assembly.

13. The lubrication mechanism of claim 12 wherein said lubrication flow path further comprises a channel communicating with said axial bore.

14. The lubrication mechanism of claim 13 wherein said arm portion of said lubrication guide member extends along said channel.

* * * * *